Feb. 26, 1957 W. H. YENNI ET AL 2,783,437
MULTIPLE-PURPOSE ELECTRICAL MEASURING INSTRUMENT
Filed Feb. 19, 1952 4 Sheets-Sheet 3

FIG. 5

INVENTORS
WILLIAM H. YENNI
BY ROBERT D. HICKOK JR.
Hudson, Loughton,
Williams, David & Hoffmann
ATTORNEYS

United States Patent Office 2,783,437
Patented Feb. 26, 1957

2,783,437

MULTIPLE-PURPOSE ELECTRICAL MEASURING INSTRUMENT

William H. Yenni, Neillsville, Wis., and Robert D. Hickok, Jr., Shaker Heights, Ohio, assignors of one-half to Auto-Test, Incorporated, Chicago, Ill., a corporation of Illinois, and one-half to Cleveland Patents, Incorporated, Cleveland, Ohio, a corporation of Ohio Application February 19, 1952, Serial No. 272,296

9 Claims. (Cl. 324—129)

This invention relates to electrical measuring instruments and, more particularly, to a multiple-purpose electrical measuring instrument of a relatively simple and highly practical construction and which can be of the manually portable "clamp-on" type and can be used to advantage for testing vehicle electrical systems without interruption of the circuit and for various other purposes.

Electrical measuring instruments of the clamp-on type have been proposed heretofore but, so far as we are aware, have not been practical or satisfactory for use on vehicle electrical systems. The reason for this is that the ampere and voltage values of vehicle electrical systems are usually low and, therefore, the available flux fields are relatively weak and, in the instruments heretofore provided, did not produce a sufficient movement of the indicating means to permit accurate readings to be obtained.

By the present invention this disadvantage is overcome and, as its principal object, provides a measuring instrument, preferably of the clamp-on type, which is practical and satisfactory for use on vehicle electrical systems or other circuits having relatively low ampere and voltage values, and in which means is employed for producing a substantial movement of the indicating means such that the indications given will be very accurate and can be easily read.

As another important object, the invention provides an electrical measuring instrument of the character referred to which will be relatively inexpensive to manufacture and which will be a multiple-purpose instrument usable selectively as an ammeter, a voltmeter, a wattmeter or a magnetometer.

Another object is to provide an electrical measuring instrument of the type having a frame structure defining a flux path and including a yoke portion movable to open and closed positions, and in which a movable indicating means is responsive to energization of a coil means from a substantially constant potential battery.

A further object is to provide an electrical measuring instrument of the character mentioned which is manually portable for moving the yoke portion into an embracing relation to a current carrying conductor, and in which the battery is of miniature size and is contained in the instrument.

Yet another object is to provide an electrical measuring instrument of the kind having a flux path frame structure and a movable indicating means, and in which a permanent magnet is movable to an effective position adjacent the frame structure for supplying flux thereto.

Still another object is to provide an electrical measuring instrument of the type embodying a flux path frame structure including a yoke portion movable to open and closed positions and a movable indicating means responsive to energization of a coil means disposed adjacent the frame structure, and also comprising a permanent magnet movable to an effective position adjacent the frame structure for supplying flux thereto while said yoke portion is open.

It is likewise an object of this invention to provide a manually portable ammeter of the clamp-on type having a yoke portion movable into an embracing relation to a current carrying conductor, and in which the energization of the coil of the indicating means from a substantially constant potential battery, such as a battery of miniature size, is controlled by a normally open manually operable switch.

As an additional object, this invention provides an electrical measuring instrument of the kind above referred to embodying a permanent magnet movable to an effective position adjacent the frame structure for supplying flux thereto, and in which circuit means connected with the coil of the indicating means includes readily accessible terminal members adapted for use in supplying to the coil an energizing current whose voltage is to be measured.

As a further object, the invention provides a multiple-purpose electrical measuring instrument usable either as a clamp-on ammeter or as a voltmeter and whose circuit means for the movable coil of its indicating means includes a first circuit portion containing a battery for energizing said coil when the instrument is used as an ammeter and a second circuit portion for connecting said coil across circuit points having a potential difference when the instrument is used as a voltmeter, and which instrument also comprises switch means for disabling one of said circuit portions when the other of said circuit portions is being used in energiing said coil.

Still another object is to provide a multiple-purpose electrical measuring instrument of the character mentioned above in which a permanent magnet is movable to an effective position for supplying the magnetic flux when the instrument is being used as a voltmeter, and in which the switch means controlling the circuit portions of the coil energizing circuit means includes a switch device adapted to be actuated when said permanent magnet is moved to or from its effective position.

Additionally, this invention provides a multiple-purpose electrical measuring instrument whose flux path frame structure includes a yoke portion comprising a yoke member movable to open or closed positions, and in which a permanent magnet, such as a permanent magnet of a magneto or the like, is movable to an effective position across the yoke opening for supplying flux to the frame structure such that the deflection of the indicating means upon energization of the coil means thereof from the battery or other source of constant potential, will be an indication of the strength of the permanent magnet.

Another object is to provide a measuring instrument of the above character in which the permanent magnet inserted into the yoke opening cooperates with the frame structure for holding the movable yoke member in its open position.

The invention can be further briefly summarized as consisting in certain novel combinations and arrangements of parts hereinafter described and particularly, set out in the claims hereof.

Figure 1:
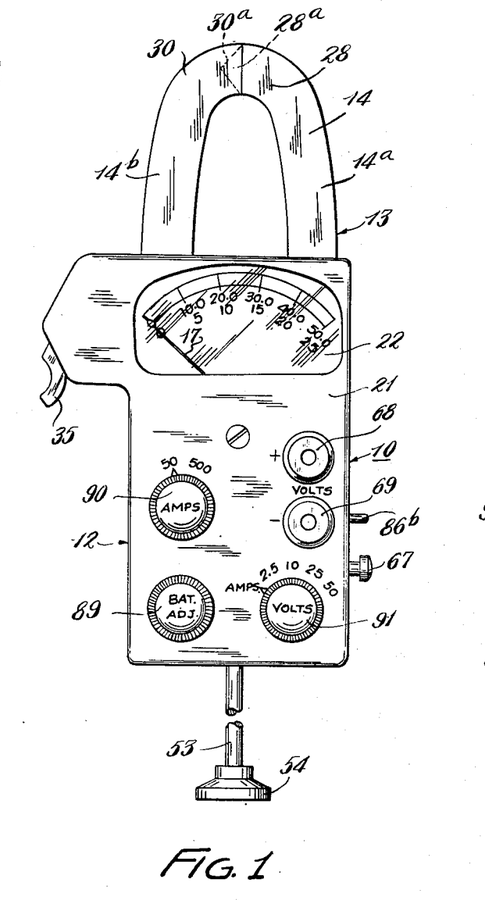
Fig. 1 is a plan view showing an electrical measuring instrument embodying the present invention.
Figure 2:
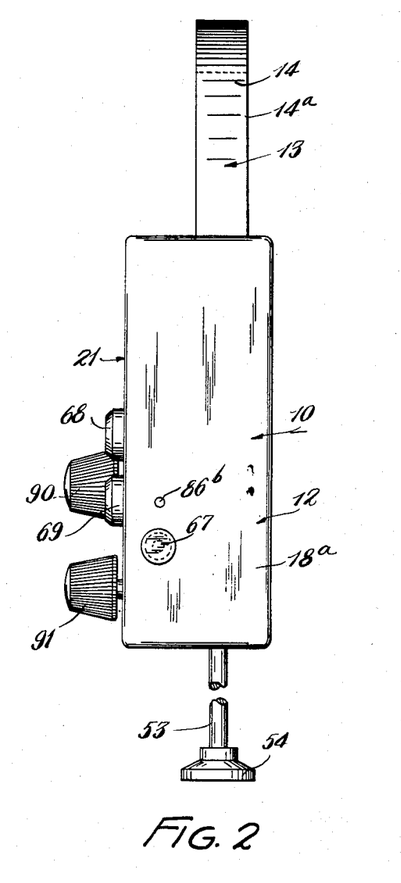
Fig. 2 is a side elevation of the instrument.
Figures 3, 4:
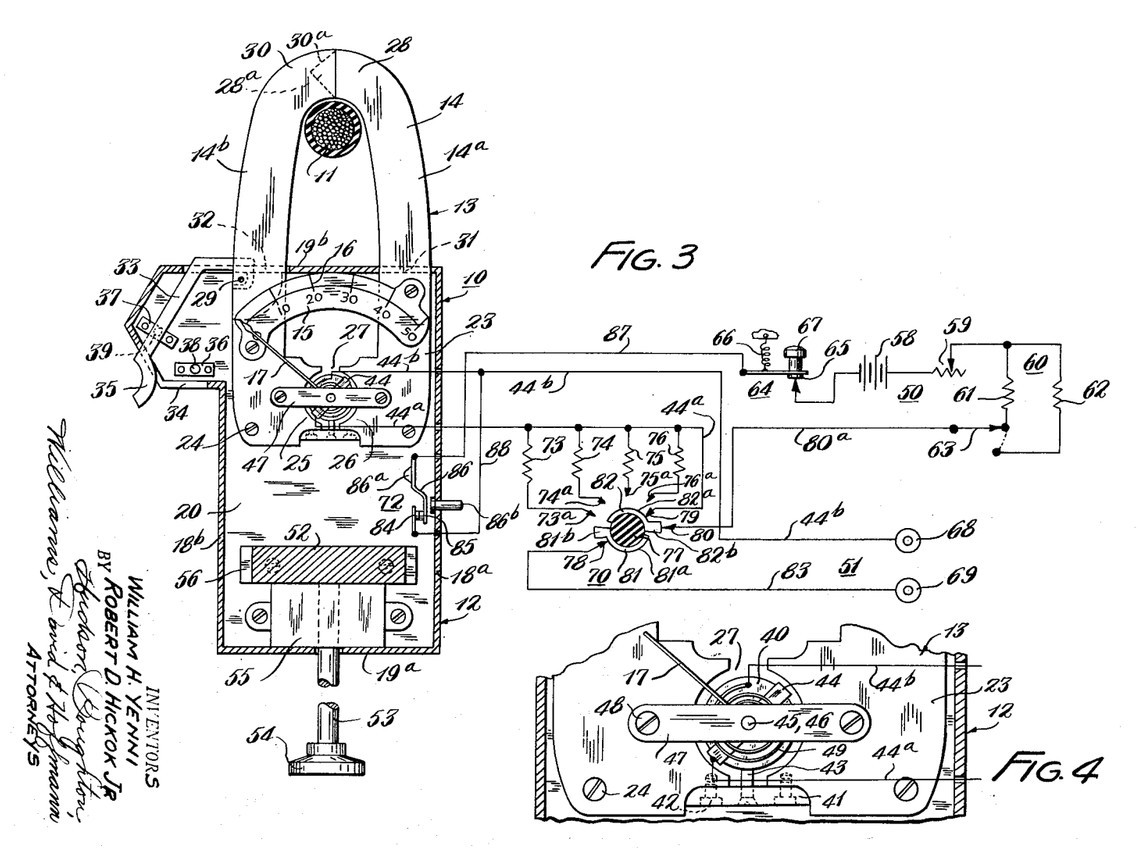
Fig. 3 is a plan view, of a somewhat diagrammatic form, showing the instrument with the housing thereof broken away and also showing the circuit connections and illustrating one way of using the instrument.
Fig. 4 is a fragmentary plan view corresponding with a portion of the instrument of Fig. 3, but showing the same on a larger scale.

As one practical embodiment of the invention, Figs. 1 to 3 inclusive show the measuring instrument 10 in the form of a so-called clamp-on instrument which is manually portable and is adapted to be applied to a current carrying conductor 11. The instrument 10 comprises, in general, a carrier means 12 and a frame structure or core 13 connected with and carried by such carrier means and here shown as having a yoke portion 14 adapted to be brought into embracing relation to the current carrying conductor 11. The instrument 10 also embodies an indicating means which is here shown as comprising an arcuate dial 15 having numbered graduations 16 thereon and a pointer or needle 17 adapted for swinging movement relative to the dial.

The carrier means 12 is here shown in the form of a housing having side walls 18ª, 18ᵇ and end walls 19ª, 19ᵇ, and also having a bottom wall 20 and a top wall or cover plate 21. The cover plate 21 is provided with a window 22 through which the dial 15 and the movable pointer 17 are visible.

The frame structure 13 defines a path for magnetic flux and comprises a base 23 located in the housing 12 and secured to the bottom wall 20 by suitable screws 24. The base 23 defines a pair of opposed pole members 25 and 26 having an air gap 27 therebetween. The yoke portion 14 projects from the housing 12 and comprises a pair of yoke arms 14ª and 14ᵇ which are carried by the base 23 and constitute extensions thereof.

The yoke arm 14ª is a stationary yoke portion or jaw having a partial hook element 28 thereon at its outer end. The yoke arm 14ᵇ is a movable yoke portion or jaw which is mounted on a suitable pivot 29 for swinging to open and closed positions. The movable yoke arm 14ᵇ is provided with a hook element 30 at its outer end and, in the closed position of this yoke arm, the hook element 30 engages the hook element 28 of the stationary yoke arm 14ª and cooperates therewith in defining a closed condition of the yoke portion 14 in which a continuous path is provided for the magnetic flux which traverses the frame structure 13.

The hook elements 28 and 30 of the yoke arms 14ª and 14ᵇ can be of any desired specific shape, but are preferably so formed that a good direct metal-to-metal engagement will be provided to form a low reluctance flux path through the yoke arms when the yoke portion 14 is in its closed condition. As here shown, one of the hook portions, in this instance, the hook portion 30 of the movable yoke arm 14ᵇ, can be provided with a recess 30ª of a desired shape extending thereinto and the other hook portion, in this instance the hook portion 28 of the stationary yoke arm 14ª, is provided with a projection 28ª of a corresponding shape which engages snugly in the recess 30ª.

The pivoted end of the movable yoke arm 14ᵇ, preferably has a close fitting direct metallic engagement with the base 23 so as to provide for low reluctance at this point for the magnetic flux. The pivoted end of the movable yoke arm 14ᵇ and the adjacent portion of the base 23 can be of any desired specific shape or contour by which this desired low reluctance condition can be obtained for the connection between these members.

As shown in Figs. 1 and 3, the stationary yoke arm 14ª projects from the forward or upper end of the housing 12 through a suitable opening 31 of the end wall 19ᵇ. The movable yoke arm 14ᵇ projects through a laterally extending slot 32 of this end wall and is accommodated therein during the swinging of this yoke arm to its open and closed positions. Such swinging movement can be imparted to the movable yoke arm 14ᵇ by any suitable actuating means.

In this instance, the actuating means for the movable yoke arm 14ᵇ is shown as comprising a lever 33 having one end thereof fixedly connected with the movable yoke arm adjacent the pivot 29. The other end of the actuating lever 33 projects from the housing through a second slot 34 and may be in the form of a trigger portion 35 adapted to be engaged by the index finger of an operator while the instrument 10 is being held in the operator's hand. By such actuation of the lever 33, the movable yoke arm 14ᵇ can be swung away from the stationary yoke arm 14ª to the open position shown in Fig. 5.

While the yoke arm 14ᵇ is in its open position, the flux path through the yoke portion 14 is interrupted by an air gap 14ᶜ of substantial width and this open condition of the yoke portion also permits the same to be readily moved into and out of an embracing relation to the current carrying conductor 11 of Fig. 3. Suitable detent means can be provided for releasably holding the movable yoke arm 14ᵇ in either its open or closed position. This detent means is here shown as comprising a pair of open and closed detent devices 36 and 37 mounted in suitable locations on the bottom wall 20 and each having a spring-pressed plunger 38 which is engageable in a recess or socket 39 of the lever 33.

The frame structure 13 also comprises an inner core member 40 which is located in the air gap 27 and is here shown as being of a substantially cylindrical shape. The inner core 40 is suitably supported in the air gap 27 as by means of a bridge member 41 which is secured to the pole members 25 and 26 by suitable screws 42 and a mounting screw 43 carried by this bridge member and having the inner core member mounted thereon.

The indicating means of the instrument 10 comprises, in addition to the above-mentioned dial 15 and pointer 16, a movable coil 44 disposed in the air gap 27 in surrounding relation to the inner core 40. The coil 44 constitutes an actuating means for the pointer 17, and accordingly, the pointer is connected with and carried by the movable coil. The coil 44 is supported in the relation just described as by means of pairs of cooperating pivot and bearing elements 45 and 46 which are connected respectively with the coil and with a pair of front and rear bridge members 47. The bridge members 47 span the air gap 27 and are connected with the pole members 25 and 26 of the frame structure 13 by suitable screws 48.

The indicating means of the instrument 10 also includes front and rear hair springs 49 which are suitably connected with the coil 44 and urge the same in a direction to return the pointer 17 to its zero position relative to the dial 15. The hair springs also serve as current carrying connections between a pair of terminal leads 50, 51 and the opposite ends of the coil 44.

Figure 5:
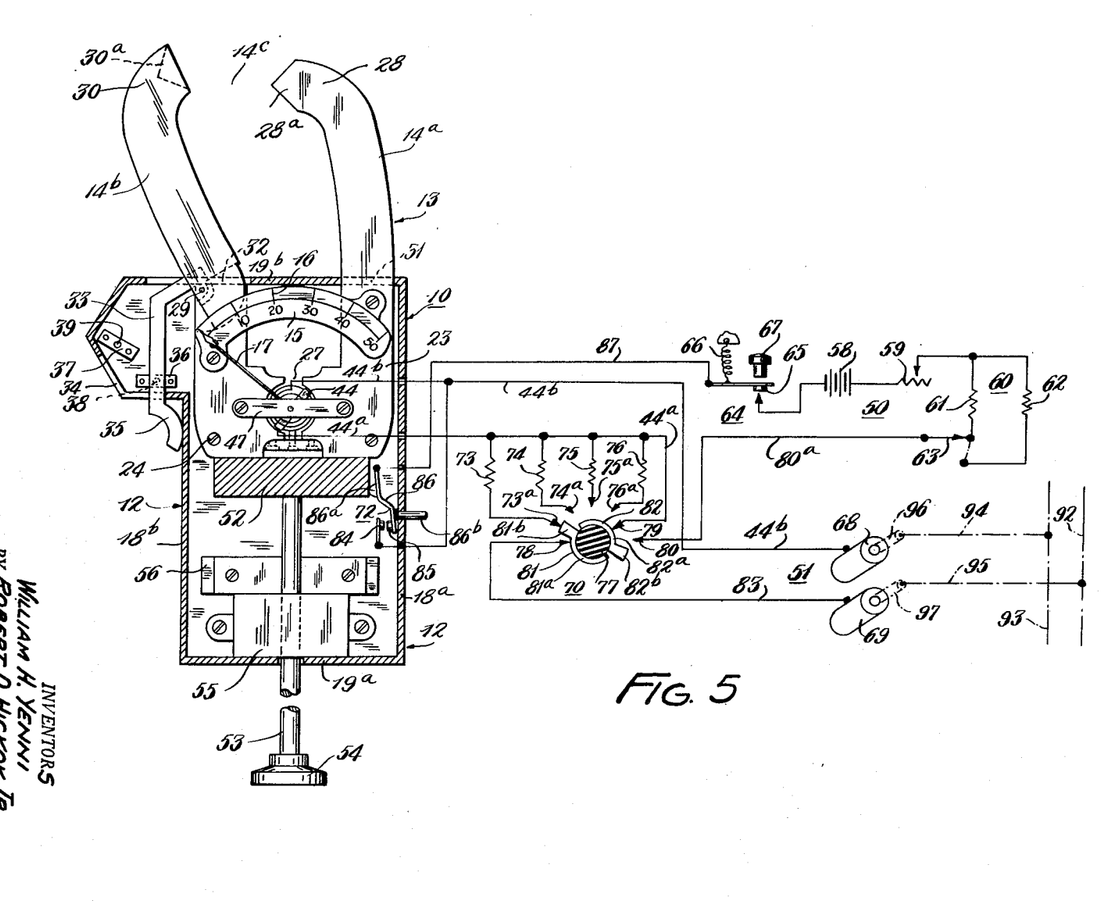
Fig. 5 is another plan view, of a somewhat diagrammatic form and similar to Fig. 3, but showing another way of using the instrument.

The measuring instrument 10 also comprises a bar type magnet 52, of a high permanence characteristic and hereinafter referred to merely as a permanent magnet, which supplies flux to the frame structure 13 when the yoke portion 14 is in its open condition as shown in Fig. 5 and is not receiving flux from the conductor 11. The permanent magnet 52 is located in the housing 12 and is movable in opposite directions to and from an effective position adjacent the frame structure 13. The effective position for the permanent magnet 52 is with one face thereof engaging the base 23 of the frame structure 13 as shown in Fig. 5. The ineffective position for this magnet is that shown in Fig. 3 in which it is spaced a substantial distance from the base 23.

The permanent magnet 52 can be moved to and from its effective position by a suitable actuating member, such as the pull rod 53, which is here shown as having its inner end connected with the magnet and its outer end provided with a handle member 54 by which pulling and pushing forces can be applied to the magnet. The actuating rod 53 extends through an opening of the end wall 19ᵃ of the housing 12 and is slidably supported in a suitable bearing 55.

In its ineffective or retracted position, the magnet 52 is engaged in a substantially U-shaped metal member 56, as shown in Fig. 3, and which member also serves as a keeper for conserving the flux strength of this magnet. When the magnet is moved to its effective position shown in Fig. 5, its mutual attraction with the frame structure 13 holds the same in its engaged position with the base 23 and, likewise, when the magnet is shifted to its ineffective position, its mutual attraction with the keeper 56 holds the magnet in its retracted or parked position.

As has been indicated above, the measuring instrument 10 is a multiple-purpose instrument which can be selectively used as an ammeter, a voltmeter, a wattmeter or a magnetometer. In Fig. 3 of the drawings, the instrument 10 is shown as being used as an ammeter for measuring the ampere value of an electric current flowing in the conductor 11. As here shown, the yoke portion 14 of the frame structure 13 has been moved into embracing relation to the conductor 11 and the movable yoke arm or jaw 14ᵇ has been swung to its closed position, such that the frame structure 13 forms a substantially closed path for the flux field surrounding the conductor and causes such flux to follow a path which traverses the pole members 25 and 26 and the air gap 27. During this use of the instrument 10 as an ammeter, the permanent magnet 52 is in its retracted or parked position in engagement with the keeper 56 and in which position it has substantially no magnetizing effect on the frame structure 13.

In accordance with an important feature of the present invention, an energizing current is supplied to the movable coil 44 while the frame structure 13 forms the above-mentioned flux path and is being traversed by the field flux of the conductor 11 to which the yoke portion 14 has been applied in a clamp-on relation. As the source of this energizing current for the coil 44, the instrument 10 embodies a battery 58 which is connected with the coil through circuit means which will be presently described and which includes the coil leads 44ᵃ and 44ᵇ extending from opposite ends of this coil. At this point of the description it is sufficient to state that the circuit means for energizing the coil 44 includes a first circuit or circuit portion 50 which contains the battery 58 and a second circuit or circuit portion 51 which is adapted for connection across circuit points having a potential difference, when the instrument is to be used as a voltmeter in the manner explained hereinafter.

The battery 58 is preferably a dry cell battery of miniature size such that it can be contained at a suitable location in the housing 12 of the manually portable instrument 10. This battery has a substantially constant terminal potential while in use and which constant potential will be maintained by the battery over a long period of service, for example, for a year or longer. The battery 58 is also of the kind having a small current rating such as a milliampere current rating. The battery 58 having the above-mentioned characteristics, can be a battery of the mercury-cadmium type such as are used in various kinds of electrical equipment, for example, in the electrical systems of hearing aid devices. The battery 58 can, if desired, be simply a small battery of the replaceable flashlight type.

The first circuit portion 50, which contains the battery 58, also includes a variable resistance device or potentiometer 59 by which the coil circuit can be adjusted with respect to the characteristics of the battery for the proper functioning of the indicating means of the instrument 10. The first circuit portion 50 preferably also includes a second variable resistance device 60 comprising calibrating resistances 61 and 62 of different resistance values and one of which is adapted to be included in the coil energizing circuit by proper positioning of the movable switch member 63. The use of one or the other of the calibrating resistances 61 and 62 in the coil circuit, permits current measurements to be made on the instrument 10 in accordance with different multiples of the indications furnished by the reference markings 16 of the dial 15.

The first circuit portion 50 also includes a normally open manually operable switch such as the push-button switch 64. The movable contact 65 of this switch is normally held in an open position by the spring 66 for disconnecting the battery 58 from the coil 44.

When the instrument 10 is being used as an ammeter and the yoke portion 14 thereof has been applied to the conductor 11, as explained above, the push-button 67 of the switch 64 is manually depressed thereby closing the switch and connecting the battery 58 with the movable coil. The energization of the coil by even a very small amount of current from the battery 58, will result in a substantial deflection of the pointer 17 along the dial 15 by the action of the flux traversing the air gap 27 to thereby produce an accurate indication of the ampere value of the current flowing in the conductor 11. As soon as the reading on the dial 15 has been noted, the push-button 67 is released to permit opening of the switch 64 after which the movable yoke arm 14ᵇ is swung to its open position by actuation of the lever 33 and the instrument is removed from the conductor 11.

To enable the instrument 10 to be used as a voltmeter in the manner to be presently described, the energizing circuit for the coil 44 is provided with an extension portion comprising the above-mentioned second circuit portion 51 which includes a pair of terminal members 68 and 69. The terminal members 68 and 69 can be mounted on the cover 21 of the instrument housing 12 and are preferably in the form of jacks or sockets into which detachable terminal plug members can be conveniently inserted.

To further adapt the instrument 10 for use as a voltmeter, the circuit means for the movable coil 44 includes a combined switch and variable resistance device 70, and a normally closed switch device 72. The combined switch and resistance device 70 comprises a group of calibrating resistances 73, 74, 75 and 76 of different resistance values and a movable switch member 77 by which any one of these different resistances can be selected for use in the coil energizing circuit. The different resistance values of these calibrating resistances adapt the coil energizing circuit of the instrument 10, such that the indications given by the movable pointer 17 can be read in accordance with different multiples of the indications 16 of the dial 15.

The switch means embodied in the combined switch and resistance device 70 comprises an arcuate group of stationary contacts 73ᵃ, 74ᵃ, 75ᵃ and 76ᵃ with which the resistances 73, 74, 75 and 76 are connected respectively and three other stationary contacts 78, 79 and 80. The device 70 also comprises two movable contact members 81 and 82 which are connected with and carried by the movable insulating member 77. The movable contact member 81 comprises an arcuate arm portion 81ᵃ which is continuously in engagement with the stationary contact 78 and a lug portion 81ᵇ which is movable into engagement with any one of the stationary contacts 73ᵃ, 74ᵃ, 75ᵃ and 76ᵃ. The movable contact 82 comprises an arcuate arm portion 82ᵃ which is continuously in engagement with the stationary contact 79 and a lug portion 82ᵇ which is movable into and out of engagement with the stationary contact 80.

The switch means of the combined device 70 controls the second circuit portion 51 and, as shown in Figs. 3 and 5, the outer ends of the resistances 73, 74, 75 and 76 and the stationary contact 79 are all connected with one end of the coil 44 by the coil lead or conductor 44ᵃ. The other end of the coil 44 is connected with the terminal member 68 by the coil lead or conductor 44ᵇ. The stationary contact 78 is connected with the terminal member 69 by the conductor 83. The stationary contact 80 is connected with the movable switch member 63 of the variable resistance device 60 by a conductor 80ª.

The normally closed switch device 72 comprises stationary and movable contacts 84 and 85 of which the movable contact 85 is carried by a yieldable arm 86 which normally urges the movable contact toward a position of closed engagement with the stationary contact 84. The arm 86 carries a thrust member 86ª which extends into the path of movement of the permanent magnet 52 such that when this magnet is moved to its effective position shown in Fig. 5, it engages the member 86ª and causes opening of the switch 72 and when the magnet is returned to its parked position the member 86ª is disengaged to permit reclosing of the switch 72. The switch arm 86 carries a stem 86ᵇ made of insulating material and which projects through the side wall 18ª of the housing 12. The outer end of the stem 86ᵇ forms a push-button which is adapted to be manually actuated for a purpose to be presently explained.

The switch device 72 controls the first circuit portion 50 and accordingly one of the contacts of this switch, in this instance the movable contact 85, is connected with the push-button switch 64 by the conductor 87. The stationary contact 84 is connected with the coil lead 44ᵇ by the conductor 88.

It may be desirable from time to time to test the battery 58 to determine whether it is capable of sufficiently energizing the movable coil 44 to produce accurate readings on the dial 15 when the instrument is intended to be used as an ammeter. Such a test of the battery 58 can readily be made by first opening the movable yoke arm 14ᵇ and shifting the permanent magnet 52 to its effective position adjacent the base 23 of the frame structure 13. Then, while the yoke portion 14 remains in its open position and disengaged from any current carrying conductor, the push-button 86ᵇ is pressed inward and deflects the arm 86 to close the contacts 84 and 85 of the switch 72 and, at the same time, the push-button switch 64 is closed. Thereupon, current from the battery 58 will energize the movable coil 44 and the resulting deflection of the pointer 17 at this time will be an indication of the condition of the battery.

It will be understood, of course, that the variable resistance devices 59, 60 and 70, as well as the push-button switch 64 and the normally closed switch 72, are all contained in the housing 12 of the instrument 10 in addition to the battery 58. As shown in Figs. 1 and 2, the variable resistance device or battery adjustment 59 is provided with a readily accessible actuating knob 89. Similarly, the variable resistance devices 60 and 70 for adjusting the indicating scale multiple during use of the instrument as an ammeter or a voltmeter, are provided with readily accessible actuating knobs 90 and 91. Likewise, the push-button 67 of the normally open switch 64 projects from the housing 12 for convenient actuation by the operator.

The use of the instrument 10 as a voltmeter is illustrated in Fig. 5. During such use of the instrument, the movable yoke arm 14ᵇ is swung to its open position and is left in this position such that the flux path through the yoke portion 14 will be interrupted by the relatively wide air gap 14ᶜ between the hook ends of the yoke arms. The permanent magnet 52 is then moved upwardly to its effective position against the base 23 of the frame structure or core 13 by a pushing force applied to the actuating knob 54. The movable coil 44 is now connected across the line conductors or circuit points whose potential difference is to be measured and which are here represented by a broken line showing as the conductors 92 and 93.

This connection of the coil 44 across the line conductors 92 and 93 can be accomplished by using a pair of suitable flexible conductors 94 and 95 which are temporarily connected to the line conductors 92 and 93 and are provided with plugs or jacks 96 and 97 adapted to be inserted into the terminal sockets 68 and 69 of the instrument. The connecting of the coil 44 across the line conductors 92 and 93 also requires setting of the switch member 77 to a position which will render the second circuit portion 51 effective, such as the position shown in Fig. 5 in which the lug 81ᵇ of the movable contact 81 is engaged with the stationary contact of a desired one of the resistances 73, 74, 75 and 76, for example, the contact 73ª of the resistance 73.

When the coil 44 has been thus connected across the line conductors 92 and 93, or across any other points or terminal members whose potential difference is to be determined, the resultant effect of the current which flows through the coil 44 and of the magnetic flux produced by the permanent magnet 52 and traversing the air gap 27, will cause a substantial deflection of the pointer 17 to indicate the voltage value of the potential difference existing across the line conductors to which the instrument has been connected. The resistor of the variable resistance device 70, which has been selected by the above-described movement of the switch member 77, will be in series circuit with the movable coil 44 and will protect the same by permitting only a small amount of current to flow through this coil while the instrument is being used as a voltmeter.

During this use of the instrument 10 as a voltmeter, the switch 72 is maintained in its open position to disable the first circuit portion 50. This is desirable because it prevents energization of the first circuit portion 50 from the second circuit portion 51 and which, if it were to occur as by an accidental closing of the push-button switch 64, might be harmful to the battery 58. However, as soon as the voltage reading on the dial 15 has been noted, the switch 70 is returned to its initial setting shown in Fig. 3 and the jacks 96 and 97 are withdrawn from the sockets 68 and 69 to disconnect the instrument from the circuit whose voltage has just been measured. The permanent magnet 52 is now also returned to its parked position in the keeper 56 thereby disengaging the thrust member 86ª and permitting the switch 72 to assume its normally closed position.

During use of the instrument 10 as a wattmeter for measuring the power being transmitted through a circuit, such as that represented by the line conductors 92 and 93, the permanent magnet 52 is left in its retracted or ineffective position and the yoke portion 14 is brought into an embracing relation to one of the line conductors, corresponding with the embracing relation illustrated in Fig. 3. The coil 44 is then connected across the same line conductors to be energized therefrom. This is accomplished by actuating the switch 70 to one of its effective settings, such as that shown in Fig. 5, and plugging the jacks 96 and 97 into the terminal sockets 68 and 69 in the same manner as was explained above during the use of the instrument as a voltmeter.

The flux field of the line conductor to which the yoke portion 14 has been applied, now traverses the frame structure 13 and the air gap 27 with a flux strength which is a function of the ampere value of the current flowing in the line conductor. At this same time the coil 44 is being energized in accordance with a function of the potential difference across the line conductors. The resulting deflection of the pointer 17 will therefore be in accordance with both voltage and current functions of the circuit being tested and the reading on the dial 15 will be an indication in watts or kilowatts of the electrical power being transmitted through the circuit. During the above-described use of the instrument as a wattmeter, the push-button switch 64 is not actuated but is left in its normally open position.

When the instrument 10 is to be used as a magnetometer, the permanent magnet 52 is left in its ineffective position shown in Fig. 3 and the yoke portion 14 is opened to the condition shown in Fig. 5 by lateral swinging of the yoke arm 14b. The permanent magnet to be tested (not shown) is then applied to the opened yoke portion 14 so as to cause the flux of such permanent magnet to traverse the frame structure 13. The pushbutton switch 64 is then closed to energize the coil 44 from the constant potential battery 58 and the resulting deflection of the pointer 17 will be a direct indication of the strength of the magnet being tested.

When the permanent magnet to be tested is a bar magnet it can be inserted between, or placed in bridging relation across, the open yoke arms 14a and 14b. When the magnet to be tested is a U-shaped or horseshoe magnet, it can be applied to the frame structure 13 so that its legs engage the respective yoke arms 14a and 14b.

The measuring instrument 10 can be constructed so that the indications given on the dial 15 during the above-described uses will be of a linear characteristic or function. That is to say, the instrument can be so constructed that the dial indications will be directly proportional to the extent of energization of the coil 44. On the other hand, the instrument can also be constructed so that the indications read from the dial 15 will have a nonlinear characteristic or function, that is to say, will not be proportional to the extent of energization of the coil 44. These linear and nonlinear functions can be obtained by varying the extent to which the frame structure 13 becomes saturated with magnetic flux during the use of the instrument in making a test and this saturation factor can, in turn, be varied or controlled by selection of the material of which the frame structure 13 is made or by varying the shape of the pole members 25 and 26.

The invention contemplates that the frame structure or core 13 will preferably be a laminated structure and will be made of a material having a low magnetic loss, that is to say, a material which is highly permeable by the magnetic flux being supplied either by the permanent magnet 52 or by a line conductor adjacent to which the yoke portion 14 has been moved. It is also important that the frame structure 13 be constructed of a material which will have a low or substantially negligible factor of retentivity, that is to say, the material of the frame structure should be such that it will have substantially no residual magnetism when the source of the flux by which it has been traversed, has been removed.

This factor of low retentivity of the frame structure 13 is important because residual magnetism remaining in the frame structure at the completion of one test, would cause an error to be introduced into the reading obtained during a succeeding test. It is highly desirable that the frame structure be in a substantially fully demagnetized condition after the completion of each test such that the flux which traverses the frame structure during the succeeding test will be only the flux being supplied by the source involved in the test then being made.

A nickel-iron alloy of the kind known as Allegheny metal possesses the properties of a high permeability and low retentivity and represents one suitable material for use in the frame structure 13 of the instrument 10. This nickel-iron alloy also has the characteristic that it does not become saturated by the magnetic flux which is supplied thereto within the range of the intended or rated use of the instrument 10. By reason of the fact that a frame structure made of such a nickel-iron alloy does not become magnetically saturated during the use of the instrument, the device will have the linear characteristic which may be desired for the readings obtained from the dial 15.

For some uses of the instrument 10, it may be desirable that the indications obtained have a nonlinear characteristic. This can be obtained by constructing the frame structure 13 from a material having a saturation point falling within the range of use or rating of the instrument. Thus, when the frame structure is made of a suitable powdered metal composition such as a suitable iron powder, or an iron alloy powder and a binder, the frame structure will have a saturation point coming within the range of intended use of the instrument 10, and this characteristic of the frame structure will result in readings of a nonlinear function being obtained from the instrument.

Figures 6, 7, 8:
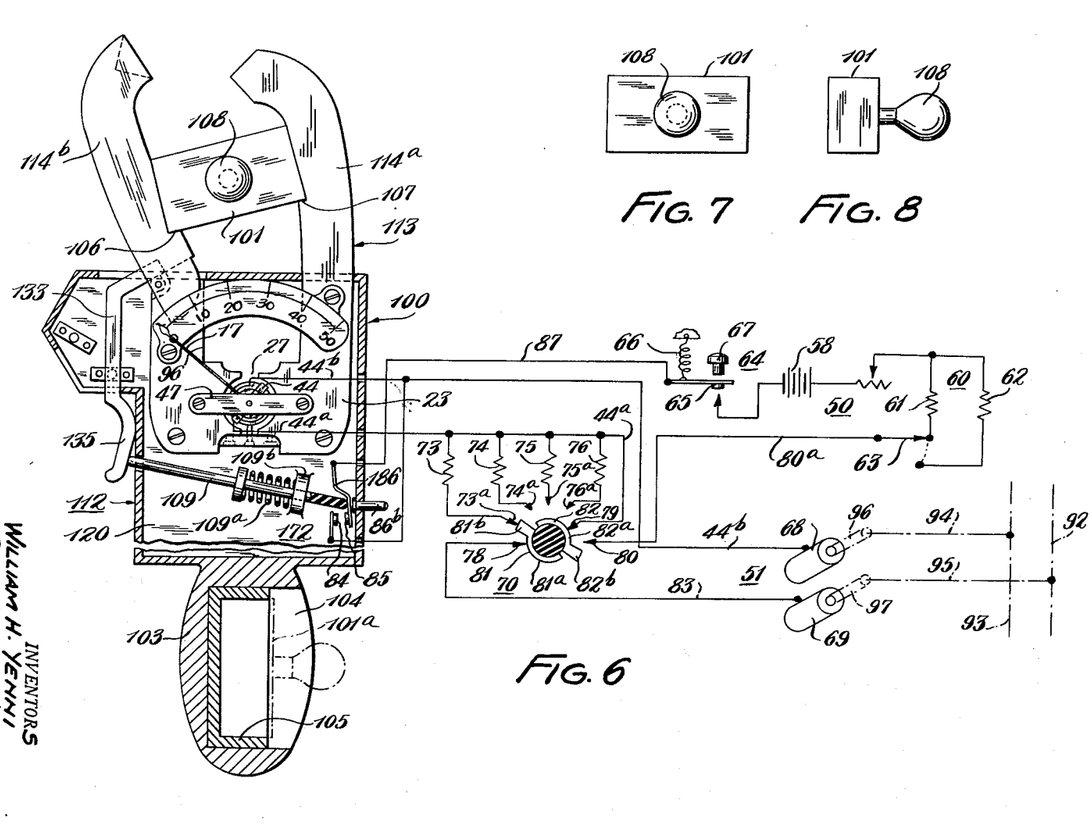
Fig. 6 is a plan view, of a somewhat diagrammatic character and similar to Fig. 5, but showing a modified form of the instrument.
Figs. 7 and 8 are plan and side views, respectively, of the movable permanent magnet embodied in the instrument of Fig. 6, but showing the magnet in detached relation.

Fig. 6 of the drawings shows an electrical measuring instrument 100 representing a modified construction which is similar to the measuring instrument 10 in all major respects except that the bar type permanent magnet 101 used therein is completely separable from the instrument and occupies a different position, as will now be described. As shown in Fig. 6, the housing 112 is provided with a handle 103 having a recess 104 in which the magnet 101 is disposed when it is not being used to supply flux to the frame structure or core 113. A substantially U-shaped metal keeper 105 located in the recess 104 forms a holder for the magnet. The broken line showing 101a represents the parked position of the magnet in the handle recess.

In this modified measuring instrument 100 the effective position of the permanent magnet 101 is in a blocking engagement with the movable yoke arm 114b by which this arm will be held open, preferably an inserted position between the movable and stationary yoke arms 114b and 114a as shown in Fig. 6. To facilitate the insertion of the magnet 101 in the proper position and to assist in holding the same in place, the yoke arms 114a and 114b are provided with notches 106 and 107 in which the ends of the magnet engage. The magnet 101 is of a high permanence characteristic and is of a size and shape such that its ends will have direct metallic engagement with the frame structure 113 for supplying magnetic flux thereto when the magnet is in its inserted position shown in Fig. 6. To enable the permanent magnet 101 to be used in the manner just described, the magnet is in the form of a square or rectangular metal block and preferably has a knob 108 projecting therefrom and adapted to be grasped by the operator for manipulating the magnet during the insertion or removal thereof.

The modified measuring instrument 100 also embodies a means for causing opening of the normally closed switch 172 when the yoke arm 114b is moved to its open position for insertion of the permanent magnet 101. This switch opening means is here shown as comprising a push rod 109 made of insulating material, such as hard fiber, and extending between the trigger portion 135 of the lever 133 and the arm 186 of the switch 172. The push rod 109 is retracted by a compression spring 109a and is slidably guided by a lug 109b of the bottom wall 120 of the housing 112.

Since the modified measuring instrument 100 is identical in all other respects with the above-described instrument 10, the same reference characters have been applied to the same corresponding parts which have not already been designated.

The modified measuring instrument 10 is shown in Fig. 6 as ready for use as a voltmeter. Upon closing of the switch device 70 the coil 44 will be connected across the conductors 92 and 93 and the resulting deflection of the pointer 17 will be an indication of the potential difference between these conductors. At this time the switch 172 is being held open by the push rod 109 so that accidental closing of the push-button switch 64 will not result in any harmful effect.

The measuring instruments 10 and 100 described above can be used as an ammeter in a somewhat different way which will now be described and which can be distinguished from the previously described ammeter use by designating it a comparative ammeter use. For this comparative ammeter use of the instrument 10, the yoke arm 14b is moved to its open position and permanent magnet 52 is moved up to its effective position shown in Fig. 5. Then, while the yoke portion 14 remains in its open position and disengaged from any current carrying conductor, the push-buttons 67 and 86b are pressed at the same time to close the switches 64 and 72.

The closing of the switches 64 and 72 will cause energization of the coil 44 from the battery 58 and the pointer 17 will be deflected in the same manner as in the above-described test for the battery. At this time, however, the reading given by the pointer 17 is noted and recorded for subsequent comparison purposes, after which the push-buttons 67 and 86$^b$ can be released. This first reading of the pointer 17 should preferably be a mid-scale reading which is made possible by proper selection of the settings for the resistance devices 59 and 60.

The open yoke portion 14 is now moved into straddling relation to a conductor whose current value is to be measured, for example the conductor extending to the starting motor of a motor vehicle and which may carry a current of a rather high ampere value, whereupon the yoke arm 14$^b$ is closed. The flux which now traverses the air gap 27 will be the resultant of the fluxes from the permanent magnet 52 and the field flux produced by the current in the conductor being embraced by the closed yoke portion 14.

The push-buttons 67 and 86$^b$ are again pressed to close the switches 64 and 72 for energizing the coil 44 from the battery 58. The resulting deflection of the pointer 17 is noted and is compared with the previously recorded reading. The difference between these two pointer readings will be an indication of the ampere value of the current flowing in the conductor.

During such a comparative ammeter use of the modified instrument 100, the permanent magnet 101 is inserted in its effective position between the yoke arms 114$^a$ and 114$^b$ as shown in Fig. 6. The push-buttons 67 and 86$^b$ are pressed to close the switches 64 and 72 for energizing the coil 44 from the battery 58. The resulting indication of the pointer 17, which again is preferably a mid-scale reading, is noted and recorded.

The permanent magnet employed in this comparative ammeter use of the instrument 100 can be the same magnet 101, or if desired, can be a similar magnet of a known predetermined flux strength. The strength of the magnet used can be such in relation to the settings of the resistance devices 59 and 60 as will give an approximate mid-scale position for the first reading of the pointer 17.

The push-buttons 67 and 86$^b$ are now released. Next, the conductor whose current is to be measured is introduced into the yoke portion 14. The introduction of the conductor into the yoke portion 14 can be accomplished either by threading the conductor through the yoke space, or by removal and replacement of the permanent magnet 101. The flux which now traverses the frame structure 113 and the air gap 127 will be the resultant of the fluxes from the permanent magnet 101 and the current carrying conductor then embraced by the yoke portion 14.

The push-buttons 67 and 86$^b$ are now depressed to again close the switches 64 and 72 for energizing the coil 44 from battery 58. The resulting deflection of the pointer 17 is noted and this second reading is compared with the previously recorded first reading. The difference between these two readings will be an indication of the value of the current flowing in the conductor.

From the accompanying drawings and the foregoing detailed description, it will now be readily understood that this invention accomplishes its general objects in that it provides an electrical measuring instrument which is a multiple-purpose instrument and can be used either as an ammeter, a voltmeter, a wattmeter or a magnetometer. Likewise, it will now be understood that this improved measuring instrument can be in the form of a clamp-on device having a yoke portion movable into embracing relation to a current carrying conductor. It will now also be understood that this invention provides an electrical measuring instrument which will be very sensitive and accurate during its use as an ammeter, even though the value of the current flowing in the conductor is small, and that this sensitivity and accuracy is achieved by reason of the fact that an energizing current is supplied to the moving coil by a battery. It will now be likewise understood that when the instrument is manually portable or in the form of a clamp-on instrument, the battery is a miniature battery and is contained in the instrument. Further, it will now be seen that this invention provides an improved measuring instrument of this character in which the battery is a substantially constant potential battery of a milliampere current rating and long life and that the energization of the coil of the instrument from the battery is controlled by a normally open push-button switch. Additionally, it will now also be understood that this invention provides a measuring instrument which embodies a permanent magnet for supplying flux to the frame structure or core during certain uses of the instrument and which magnet is movable to and from an effective position adjacent the frame structure.

Although the multiple-purpose electrical measuring instrument of this invention has been illustrated and described herein to a somewhat detailed extent, it will be understood, of course, that the invention should not be regarded as being limited correspondingly in scope, but includes all changes and modifications coming within the terms of the claims hereof.

Having thus described our invention, we claim:

1. In a multiple-purpose electrical measuring instrument, a frame structure having a pair of spaced pole portions and a yoke portion and defining a path for magnetic flux, indicating means including a movable indicating member, a coil movable in the space between said pole portions and connected with said movable indicating member to actuate the same, a battery, circuit leads connected with said battery and coil for use in supplying energizing current to the latter, said yoke portion comprising a yoke member which is movable to open and closed positions corresponding with open and closed conditions of the yoke portion of the magnetic flux path, a permanent magnet of a high permanence characteristic movable to a position adjacent said frame structure such that flux emanating from said permanent magnet traverses said pole portions when said movable yoke member is in its open position, said yoke portion being movable to a position in embracing relation to a current carrying conductor for causing the flux field of the latter to traverse said pole portions and said permanent magnet being movable away from said frame structure so as to have substantially no effect on the latter when said yoke portion is in said embracing relation, and a normally open push-button switch controlling the coil energizing circuit.

2. A manually portable electrical measuring instrument comprising, a carrier means, a frame structure connected with said carrier means and having a pair of spaced pole portions and a yoke portion and defining a path for magnetic flux, indicating means on said carrier means including a movable indicating member, a coil movable in the space between said pole portions and connected with said movable indicating member to actuate the same, said yoke portion comprising a yoke member which is movable to open and closed positions corresponding with open and closed conditions of the yoke portion of the magnetic flux path, a permanent magnet of a high permanence characteristic movable relative to said carrier means and frame structure to an effective position adjacent said frame structure in which flux emanating from said permanent magnet traverses said pole portions when said movable yoke member is in its open position, circuit means connected with said coil for use in supplying energizing current thereto and including a pair of readily accessible terminal members mounted on said carrier means, said yoke portion being movable to a position in embracing relation to a current carrying conductor for causing the flux field of the latter to traverse said pole portions and said permanent magnet being movable away from said frame structure so as to have substantially no effect on the latter when said yoke portion is in said embracing relation, a miniature battery supported by said carrier means and connected with said circuit means, and a normally open push-button switch on said carrier means and controlling the energization of said coil by said battery through said circuit means.

3. In an electrical measuring instrument, a frame structure having pole members and an openable yoke portion, indicating means including a movable indicating member, a coil movable relative to said pole members and connected with said indicating member to actuate the latter, circuit means connected with said coil for use in supplying electrical energy thereto and comprising a first circuit portion and a second circuit portion, a normally closed switch in said circuit means and adapted to be opened for preventing energization of said first circuit portion by energy from said second circuit portion, a permanent magnet of a high permanence characteristic movable to an effective position engaging said frame structure such that flux emanating from said permanent magnet traverses said pole members, and thrust transmitting means actuated by opening movement of said openable yoke portion for causing opening of said normally closed switch.

4. In an electrical measuring instrument, a frame structure having pole members, indicating means including a movable indicating member, a coil movable relative to said pole members and connected with said indicating member to actuate the latter, circuit means connected with said coil for use in supplying electrical energy thereto and comprising a first circuit portion and a second circuit portion, a normally closed switch in said circuit means and adapted to be opened for preventing energization of said first circuit portion by energy from said second circuit portion, a permanent magnet of a high permanence characteristic movable to an effective position engaging said frame structure such that flux emanating from said permanent magnet traverses said pole members, and means projecting into the path of movement of said permanent magnet and being engageable and movable by the latter for causing opening of said normally closed switch in response to the movement of said permanent magnet to said effective position.

5. In an electrical measuring instrument, a frame structure having a pair of spaced pole portions and a yoke portion and defining a path for magnetic flux, indicating means including a movable indicating member, a coil movable in the space between said pole portions and connected with said movable indicating member to actuate the same, circuit means connected with said coil for use in supplying electrical energy thereto, said yoke portion comprising a stationary yoke member and a movable yoke member which is movable to open and closed positions corresponding with open and closed conditions of the yoke portion of the magnetic flux path, and a permanent magnet movable to and occupying a position between said yoke members such that said movable yoke member is retained thereby in its open position and such that flux emanating from said permanent magnet traverses said pole portions.

6. In a multiple-purpose electrical measuring instrument, a frame structure having a pair of spaced pole portions and a yoke portion and defining a path for magnetic flux, indicating means including a movable indicating member, a coil movable in the space between said pole portions and connected with said movable indicating member to actuate the same, said yoke portion comprising a yoke member which is movable to open and closed positions corresponding with open and closed conditions of the yoke portion of the magnetic flux path, said yoke portion being movable to a position in embracing relation to a current carrying conductor for causing the flux field of the latter to traverse said pole portions when the instrument is to be used as an ammeter, a permanent magnet of a high permanence characteristic movable to a position adjacent said frame structure such that flux emanating from said permanent magnet traverses said pole portions when said movable yoke member is in its open position and said instrument is to be used as a voltmeter, circuit means connected with said coil for supplying energizing current thereto and comprising a first circuit portion and a second circuit portion, a battery in said first circuit portion for supplying energizing current to said coil during said use of the instrument as an ammeter, means adapting said second circuit portion for connection across circuit members having a potential difference for supplying energizing current to said coil during said use of the instrument as a voltmeter, and switch means controlling said circuit means including a switch device adapted to be actuated for disabling said first circuit portion when said second circuit portion is effective for supplying energizing current to said coil.

7. A multiple-purpose electrical measuring instrument as defined in claim 6 in which said switch device comprises a normally closed switch adapted to be opened when said permanent magnet is moved to its effective position.

8. A multiple-purpose electrical measuring instrument as defined in claim 6 in which said switch means also comprises a normally open manually operable switch in each of said first and second circuit portions.

9. A manually portable electrical measuring instrument comprising, a housing, a magnetic frame structure having a base portion disposed in said housing and defining a pair of spaced pole portions, said frame structure also having an openable yoke portion connected with said base portion and projecting outwardly from said housing, a coil movable in the space between said pole portions, a dial, a pointer connected with said coil and movable thereby relative to said dial in response to energization of said coil, circuit means connected with said coil for supplying energizing current thereto, a bar type permanent magnet of a high permanence characteristic located in said housing in spanning engagement with said pole portions and defining with the latter a magnetic circuit extending across said space when said yoke is open, said magnet being shiftable in said housing for movement into and out of said spanning engagement, and means connected with said magnet and projecting from said housing for imparting such movement to the magnet.

References Cited in the file of this patent
UNITED STATES PATENTS

| | | |
|---|---|---|
| 1,105,481 | Brown | July 28, 1914 |
| 1,120,217 | Morris | Dec. 8, 1914 |
| 2,002,680 | Scott | May 28, 1935 |
| 2,309,927 | Beede | Feb. 2, 1943 |
| 2,440,244 | Brown | Apr. 27, 1948 |
| 2,497,669 | Haley | Feb. 14, 1950 |